United States Patent [19]
Hayashi

[11] Patent Number: 5,938,788
[45] Date of Patent: Aug. 17, 1999

[54] MAXIMUM LIKELIHOOD DECODING METHOD AND INFORMATION REPRODUCING APPARATUS CORRESPONDING THERETO

[75] Inventor: Nobuhiro Hayashi, Kanagawa, Japan

[73] Assignee: Sony Corporation, Tokyo, Japan

[21] Appl. No.: 08/748,679

[22] Filed: Nov. 13, 1996

[30] Foreign Application Priority Data

Nov. 16, 1995 [JP] Japan ................................... 7-322392

[51] Int. Cl.[6] ................................................ G06F 11/10
[52] U.S. Cl. .................... 714/794; 371/43.2; 371/43.4; 371/43.7; 371/43.8; 371/262; 371/341; 371/232
[58] Field of Search .................. 371/43.6, 43.7, 371/43.2, 43.8, 43.4, 45, 5.1; 375/262, 341, 232

[56] References Cited

U.S. PATENT DOCUMENTS

| | | | |
|---|---|---|---|
| 4,777,636 | 10/1988 | Yamashita et al. | 371/43 |
| 5,095,484 | 3/1992 | Karabed et al. | 371/30 |
| 5,327,440 | 7/1994 | Fredrickson et al. | 371/43 |
| 5,432,820 | 7/1995 | Sugawara et al. | 375/341 |

OTHER PUBLICATIONS

Biver, M., et al. "In–Place Updating of Path Metrics in Viterbi Dicoders", IEEE Jnl. Solid–State Circuits, vol. 24, No. 4, pp. 1158–1160, Aug. 1989.

Collins, "Decoding of Trellis Codes" IEEE, pp. 28–29, 1988.

Provence et al. "Systolic Arrays for Viterbi Processing in Communication Systems with a Time–Dispersive Channel", IEEE, pp. 1148–1156, Oct. 1988.

Primary Examiner—William Grant
Assistant Examiner—McDieunel Marc
Attorney, Agent, or Firm—Limbach & Limbach, LLP

[57] ABSTRACT

A Viterbi decoder corresponding to PR IV system is composed of an even signal sequence processing circuit and an odd signal sequence processing circuit. A branch metric calculating circuit calculates branch metrics with an amplitude reference level R. In each of expressions for calculating the branch metrics, the number of adding operations is described to one or less. By averaging the number of calculations, the calculation speed of branch metrics can be increased. Thus, the overall process speed of the decoder can be increased. In addition, with a limitation of which the LSB of the reference level R is fixed to "0", the bit width of data to be calculated can be decreased. As a result, the number of adders, registers, and so forth can be decreased.

18 Claims, 5 Drawing Sheets

MAXIMUM LIKELIHOOD DECODING METHOD AND INFORMATION REPRODUCING APPARATUS CORRESPONDING THERETO

BACKGROUND OF THE INVENTION

1. Field of the Invention

The present invention relates to a maximum likelihood decoder for reproducing digital data from a magnetic disk and a magnetic tape and an information reproducing apparatus corresponding thereto.

2. Description of the Related Art

Magnetic recording apparatuses sometimes use modulation codes corresponding to partial response class IV PR (1, 0, −1) or class I PR (1, −1). FIG. 1 shows a block diagram of a recording/reproducing system using modulation codes corresponding to class IV. An input signal is modulated by a channel encoder 11 and then recorded. The recorded signal is differentiated by a magnetic recording/reproducing system 12. The differentiated signal is reproduced as a signal containing noise. The magnetic recording/reproducing system 12 is integrally composed of a recording circuit, a recording head, a record medium, a reproducing head, and a reproducing circuit. In addition, the magnetic recording/reproducing system 12 includes a system polynomial 1-D portion 13 and an adder 14. The adder 14 adds the input signal received from the system polynomial 1-D portion 13 and noise. The reproduced signal is equalized corresponding to the partial response class IV by an equalizer. The equalized signal is decoded corresponding to maximum likelihood decoding method by a Viterbi decoder 16. The decoded signal is converted into the original data by a channel decoder 17.

The system polynomial of the partial response class IV (namely, PR(1, 0, −1)) is expressed by $G(D)=1-D^2$. The system polynomial of the partial response class I (namely, PR(1, −1)) is expressed by $G(D)=1-D$. Thus, PR(1, 0, −1) is treated as two independent PR(1, −1)s that are alternately nested in time slots. Thus, as shown in FIG. 2, the partial response decoder 1 can be divided into two PR(1, −1) decoders 2 and 3. In other words, the input signal sequence is divided into an even signal sequence and an odd signal sequence by an input switcher 4. The even signal sequence is supplied to the decoder 2. The odd signal sequence is supplied to the decoder 3. After the individual signal sequences are processed by the respective decoders, the resultant signal sequences are composed by an output switcher 5. In such a manner, systems of combinations of PR(1, −1) and various modulation codes have been widely used.

As exemplified by the Viterbi decoder 16 shown in FIG. 1, the maximum likelihood decoding method is well known as a decoding method. In the maximum likelihood decoding method, with values of sample points before and after a considered point, a maximum likelihood signal sequence is estimated. The Viterbi decoder has an ACS (Add Compare Select) portion and a path memory portion. The ACS portion calculates a path metric and thereby estimates a survival path. The path memory portion obtains decoded results with the estimated results. The process for calculating a path metric is performed by comparing a path metric value of one sample prior with a branch metric value for each path.

Another technique has been proposed as for example U.S. Pat. No. 5,095,484. In this technique, the partial response and matched spectral null code (hereinafter referred to as MSN code) that allows the minimum Euclidean distance between each code to increase are combined and then Viterbi-decoded so as to enhance the detection performance. For example, in a system of which the PR(1, −1) channel and 8/10 MSN code are combined, a trellis diagram shown in FIG. 3 is obtained. In FIG. 3, symbols on the left represent detected results of the Viterbi decoder and decoder input (2 bits each). For example, 01/−11 represents that when two bits −1 and 1 are input to the Viterbi decoder, the detected results are two bits 01.

In this case, the path metric is calculated by Formula 1.
(Formula 1)

$$pm'_1 = \max\{pm_1+bm_{-11}, pm_2+bm_{01}\}$$
$$pm'_2 = \max\{pm_1+bm_{0-1}, pm_2+bm_{1-1}, pm_3+bm_{-10}, pm_4+bm_{00}\}$$
$$pm'_3 = \max\{pm_1+bm_{00}, pm_2+bm_{10}, pm_3+bm_{-11}, pm_4+bm_{01}\}$$
$$pm'_4 = \max\{pm_3+bm_{0-1}, pm_4+bm_{1-1}, pm_5+bm_{-10}, pm_6+bm_{00}\}$$
$$pm'_5 = \max\{pm_3+bm_{00}, pm_4+bm_{10}, pm_5+bm_{-11}, pm_6+bm_{01}\}$$
$$pm'_6 = \max\{pm_5+bm_{0-1}, pm_6+bm_{1-1}\}$$

In Formula 1, a path metric value in a state 1 at predetermined time is denoted by $pm_1$. A branch metric in the case that the decoder input is $v_1$ and $v_2$ is denoted by $bmv_1v_2$. The resultant new path metric value is denoted by $pm'_1$.

Assuming that the actually observed sample value is denoted by $z_1$ and $z_2$ and the amplitude reference level is denoted by R, $bmv_1v_2$ is calculated by Formula 2.
(Formula 2)

$$bm_{v_1v_2} = -(v_1R-z_1)^2-(v_2R-z_2)^2 = -v_1^2R^2+2v_1Rz_1-z_1^2-v_2^2R^2+2v_2Rz_2-z_2^2$$

The amplitude reference level R has an amplitude value +1 that is a target value of AGC when there is no equalizing error.

To select an optimum path, a selected term of Formula 1 is significant rather than the absolute value of the path metric. Thus, even if the same value is multiplied by or added to every term of the expressions of Formula 1, the results are the same. Thus, when the following expression is calculated as bm, the square calculations can be omitted.

$$1/R \cdot (bm+z_1^2+z_2^2)$$

Thus, bm used for the calculations can be obtained by Formula 3. Since a calculation of $Z_2^2$ is omitted, the resultant calculations can be simplified.
(Formula 3)

$$bmv_1v_2 = -v_1^2+2v_1z_1-v_2^2R+2v_2z_2$$

The ACS portion calculates each expression of Formula 1 with such values and outputs a term selected in each expression to the path memory. The selected term in each expression represents the maximum likelihood branch in each state.

Calculation expressions varies in each branch metric. The overall process speed of the Viterbi decoder is limited by a branch that takes the longest calculation time. Thus, even if there is one branch metric that requires a complicated branch metric, the overall process speed is decreased.

When three bits 1, 0, −1 are applied for Formula (3), branch metrics of individual input patterns are expressed by Formula 4. However, due to the characteristics of PR(1, −1), since input patterns 11 and −1−1 do not exist, the calculation expressions thereof are omitted.

(Formula 4)

$$bm_{-10} = -R - 2z_1$$
$$bm_{-11} = -2R - 2z_1 + 2z_2$$
$$bm_{0-1} = -R - 2z_2$$
$$bm_{00} = 0$$
$$bm_{01} = -2R + 2z_2$$
$$bm_{1-1} = -2R + 2z_1 - 2z_2$$
$$bm_{10} = -R + 2z_1$$

A calculation of which a constant 2 is multiplied can be simply accomplished by a simple bit shift operation. Thus, this calculation can be omitted. However, since each of $bm_{-11}$ and $bm_{1-1}$ are obtained by the sum of three terms, their calculation time becomes long. Thus, these terms adversely affect the overall processing speed of the decoder.

OBJECTS AND SUMMARY OF THE INVENTION

An object of the present invention is to provide a maximum likelihood decoder for allowing calculation time for branch metrics to decrease and thereby process speed to increase and an information reproducing apparatus corresponding thereto.

The present invention is a maximum likelihood decoding method, comprising the steps of (a) calculating a plurality of branch metrics corresponding to input data sequences, (b) adding each of the calculated branch metrics and a path metric at the point so as to obtain a new path metric, and (c) comparing the obtained path metrics and outputting a maximum likelihood path until the current point, wherein the step (a) is performed by calculating branch metrics as corrected branch metrics so that the calculation time of each of the branch metrics is averaged.

The present invention is an information reproducing apparatus for reproducing data from a recording medium corresponding to partial response system, comprising a converter for converting a signal reproduced from the recording medium into a digital signal, equalizer for equalizing the digital signal, a maximum likelihood decoder for decoding the reproduced signal corresponding to maximum likelihood decoding method, wherein the maximum likelihood decoder calculates branch metrics as corrected branch metrics so that the calculation time of each of the branch metrics is averaged.

In calculations for estimating a survival path in the Viterbi decoding process, the relation of values between each path metric is significant rather than the absolute values thereof. Thus, a structure of which the calculation time of each branch metric is averaged is employed. The number of adding operations and/or subtracting operations for calculating each branch metric is limited to one. In such a manner, the calculation time for a branch metric that takes the longest time can be decreased. Thus, the overall process speed of the decoder can be increased.

These and other objects, features and advantages of the present invention will become more apparent in light of the following detailed description of best mode embodiments thereof, as illustrated in the accompanying drawings.

DETAILED DESCRIPTION OF THE PREFERRED EMBODIMENTS

Figure 4:
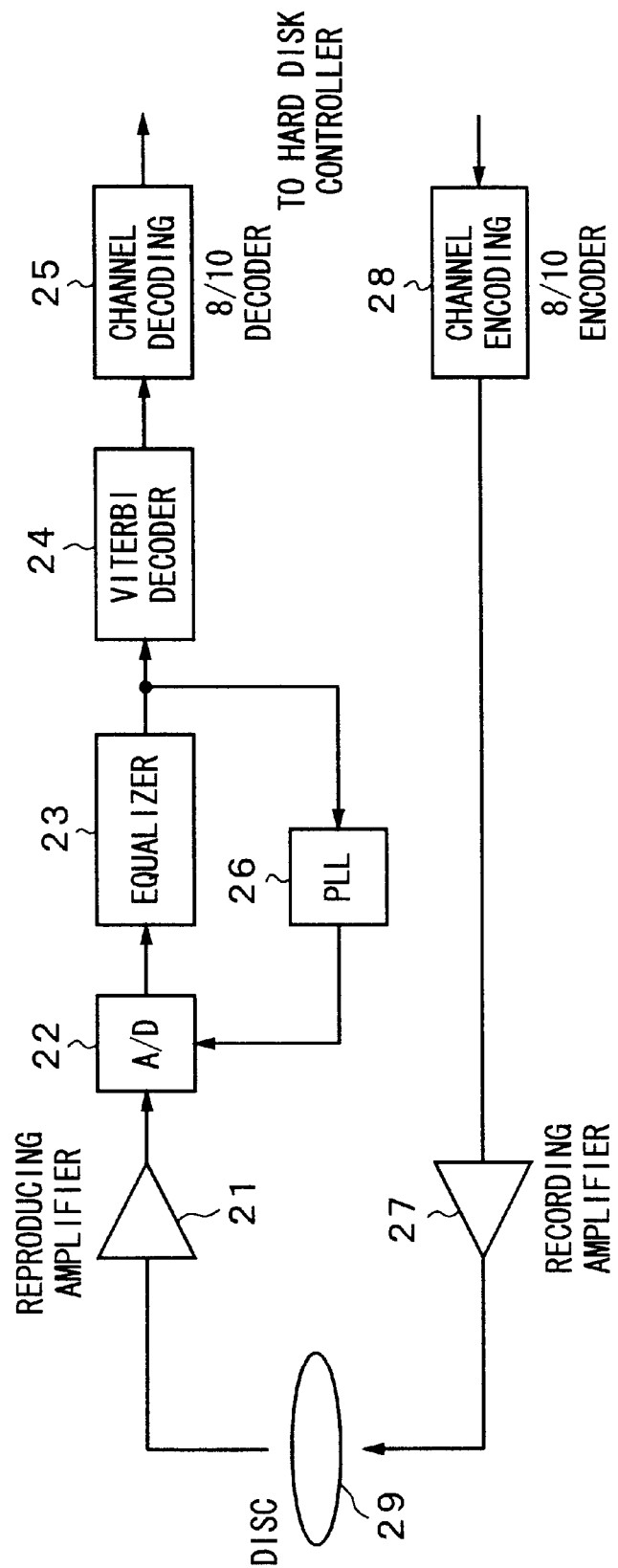
FIG. 4 is a block diagram showing a structure of a data recording apparatus according to the present invention.

Next, an embodiment of the present invention will be described. FIG. 4 shows a structure of a data recording apparatus according to the embodiment of the present invention. Data to be recorded is output from a hard disk controller. A channel encoder 28 modulates the input data received from the hard disk controller and outputs an MSN code. The resultant signal is recorded to a recording medium 29 (for example, an erasable optical disc) through a recording amplifier 27. A channel encoding process performed by the channel encoder 28 is 8/10 converting process of which information words of for example eight bits are converted into code words of 10 bits so as to limit the run length. In the 8/10 converting process, data is modulated so that the minimum distance between any two code words exceeds a predetermined value.

A signal reproduced by the record medium 29 is supplied to an A/D converter 22 through a reproducing amplifier 21. The A/D converter 22 converts the reproduced signal into a digital signal. An equalizer 23 equalizes the digital signal corresponding to the characteristics of the partial response class IV. A PLL 26 reproduces a clock signal with the equalized signal. In addition, the equalized signal is decoded by a Viterbi decoder 24. The decoded signal is also decoded by a channel decoder 25. Thereafter, the resultant signal is sent to a host computer through a hard disk controller. The channel decoder 25 converts code words of 10 bits into information words of eight bits in the reverse manner of the channel encoder 28.

Figure 5:
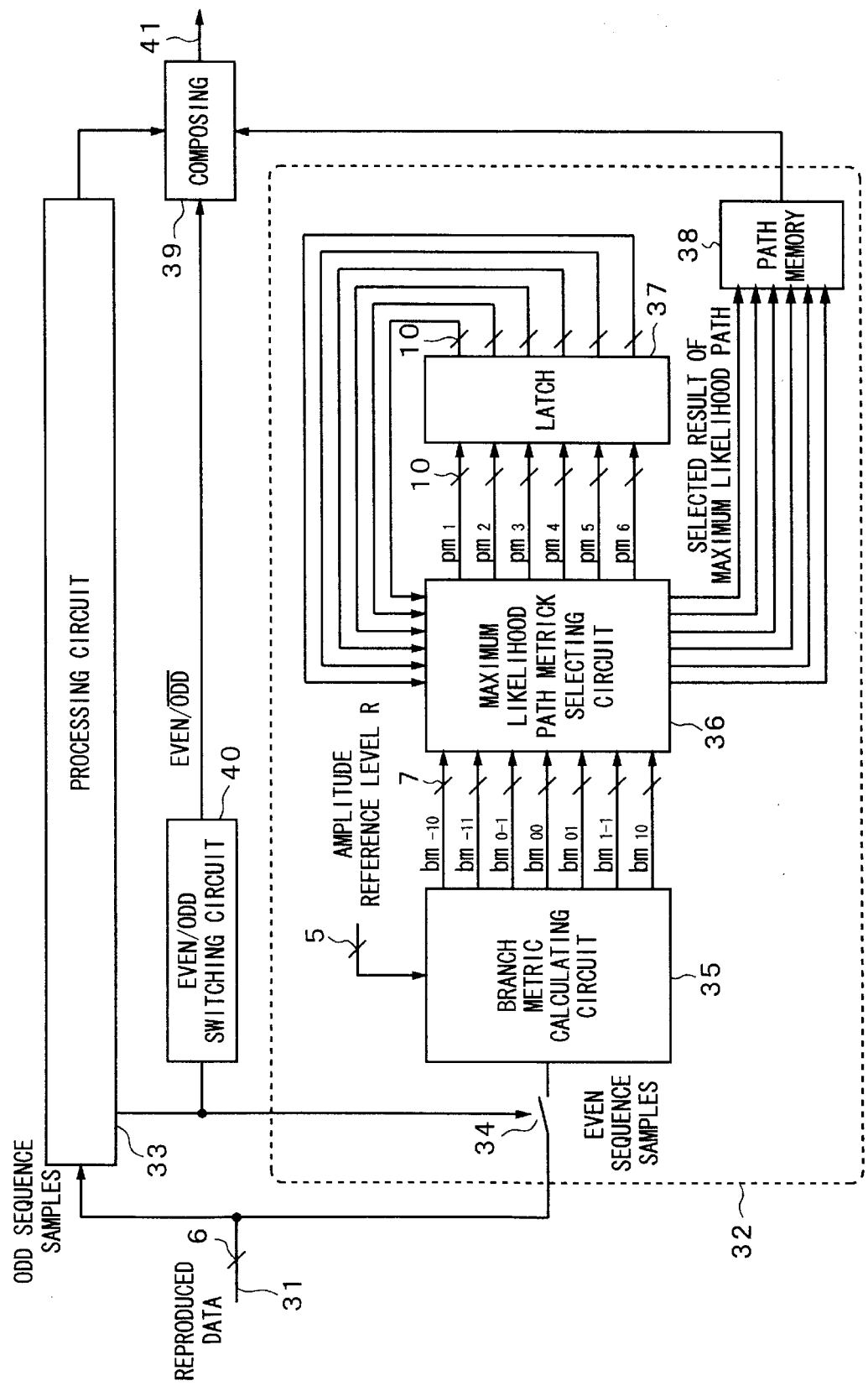
FIG. 5 is a block diagram showing a structure of a Viterbi decoder according to an embodiment of the present invention.

FIG. 5 is a schematic diagram showing an example of a detailed structure of the Viterbi decoder 24. A reproduced signal 31 sampled by the A/D converter 22 is deinterleaved by a switcher 34 for every second bit. The resultant signals are supplied to an even signal sequence processing circuit (decoder) 32 and an odd signal sequence processing circuit (decoder) 33. The structure of the decoder 32 is the same as the structure of the decoder 33. FIG. 5 shows a detailed structure of the even signal sequence processing circuit 32.

Figure 1:
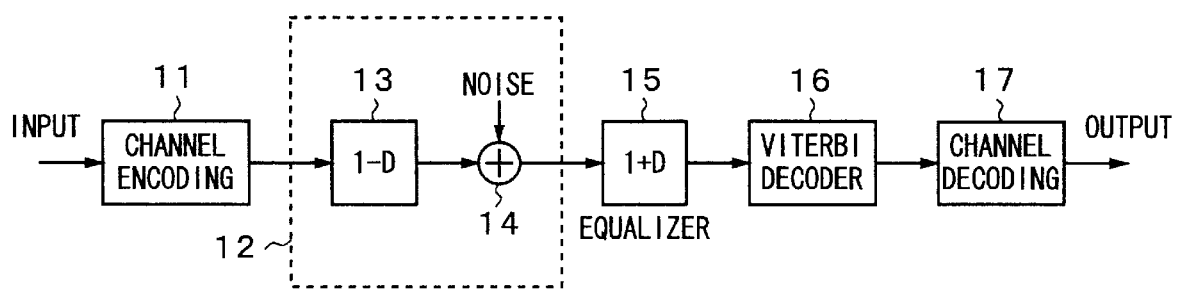
FIG. 1 is a block diagram showing a structure of a recording/reproducing system using modulation codes corresponding to a partial response.
Figure 2:
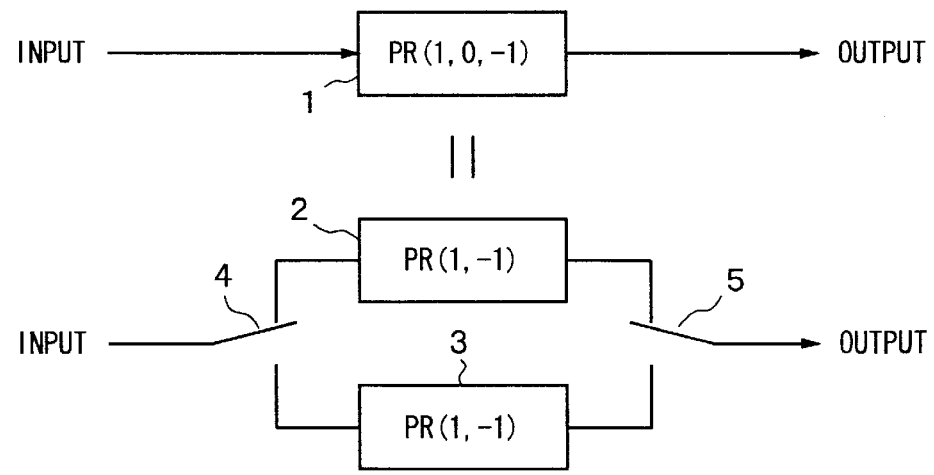
FIG. 2 is a schematic diagram for explaining the relation between a partial response (1, 0, −1) and a partial response (1, −1)
Figure 3:
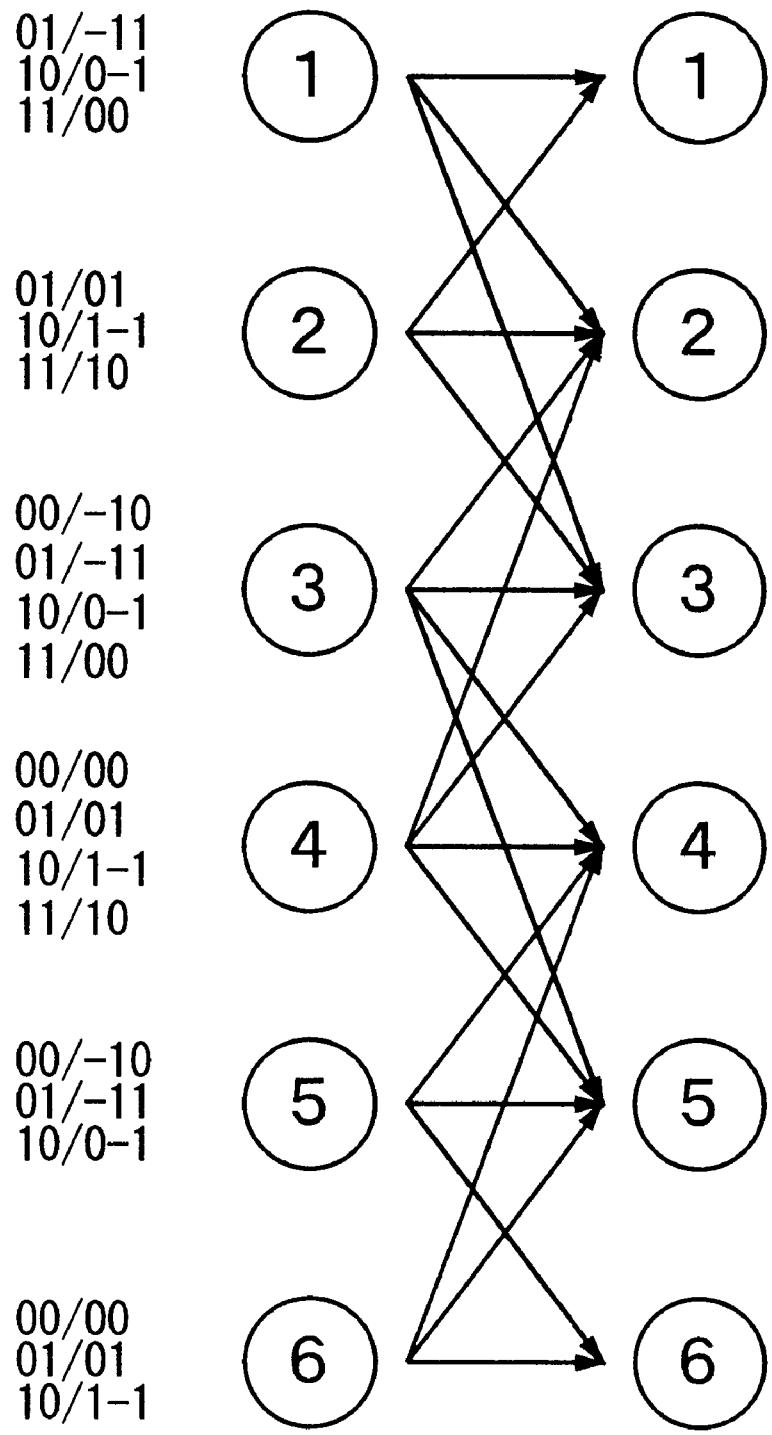
FIG. 3 is a schematic diagram showing an example of a trellis diagram of a system as a combination of the partial response (1, −1) and an MSN code.

FIG. 3 shows a trellis that the even signal sequence and odd signal sequence Viterbi decoders track. In other words, the trellis has six inner states. The values of two successive samples are processed at a time. In FIG. 3, codes on the left of the trellis represent the detected results and decoder input of the Viterbi decoder (two bits each). For example, 01/−11 represents that when the input value of one Viterbi decoder is two bits (−1, 1), the detected results become two bits (01).

Assuming that the values of the two successive samples are denoted by $z_1$ and $z_2$ and the amplitude reference level is denoted by R, a branch metric calculating circuit 35 calculates branch metrics $bm_{-10}$ to $bm_{10}$ corresponding to Formula 5. Formula 5 is obtained by adding 2R to the individual expressions of Formula 4.
(Formula 5)

$bm_{-10} = R - 2z_1$ $bm_{-11} = -2z_1 + 2z_2$ $bm_{0-1} = R - 2z_2$ $bm_{00} = 2R$ $bm_{01} = R + 2z_2$ $bm_{1-1} = 2z_1 - 2z_2$ $bm_{10} = R = 2z_1$

A maximum likelihood path metric selecting circuit 36 selects a maximum likelihood path corresponding to the rules of Formula 1. A latch 37 latches path metrics. Numerals on individual signal lines represent bit widths thereof. For example, when the sample bit width of the A/D converter is six bits, since the amplitude reference level R does not have a sign, the bit width thereof is five bits. The bit width of an adder for calculating branch metrics bm is seven bits. The bit width of a register for storing and updating path metrics is for example 10 bits to prevent the register from overflowing. As expressed in Formula 1, the bit widths of an adder and a comparator for calculating path metrics are 10 bits. It should be noted that the bit widths of these devices are only examples. Thus, when the sample bit width of the A/D converter is changed, the bit widths of pm and bm necessary for inner calculations will be increased or decreased.

The selected results of the maximum likelihood path are supplied to a path memory 38. The path memory 38 selects one survival path from the information received from the maximum likelihood path metric selecting circuit 36. The detected results of the path memory 38 are supplied to a composing circuit 39. The composing circuit 39 composes the even signal sequence and the odd signal sequence and outputs final decoded results 41. An output signal of an odd/even signal sequence switching circuit 40 is supplied to the composing circuit 39 so that it can compose the output signal of the even signal sequence processing circuit 32 and the output signal of the odd signal sequence processing circuit 33.

In the above-described example, PR(1, 0, -1) was treated as two independent PR(1, -1)s. However, it should be noted that the present invention can be applied for circuits for PR(1, -1) and PR(1, 1).

As is clear from Formula 5, according to the above-described embodiment, the calculation time of each branch metric can be averaged. Thus, the calculation time of a branch metric that takes the longest time can be decreased. Thus, the overall process speed of the decoder can be increased.

According to the above-described embodiment, the maximum operation frequency of the Viterbi decoder can be increased. Next, another embodiment that can increase the operation speed and reduce the circuit scale than the above-described embodiment will be described as a second embodiment of the present invention.

In the first embodiment, when the sample bit width of the A/D converter is six bits, since the amplitude reference level R does not have a sign, the bit width thereof is five bits. The bit width of the adder for calculating branch metrics bm is seven bits. The bit width of the adder for calculating a path metric pm is 10 bits. The bit width of the register for storing pm is 10 bits. On the other hand, in the second embodiment, the circuit has a limitation of which the LSB (Least Significant Bit) of the amplitude reference level R is fixed to "0". As the calculation expressions for branch metrics bm, as with the first embodiment, Formula 5 is used.

As is clear from these calculating expressions, all branch metrics bm are calculated by the sum or difference of R, $2z_1$, and/or $2z_2$. The calculation of $2z_1$ is performed by shifting $z_1$ for one bit in the MSB direction and setting the LSB to "0". Thus, with a limitation of which the LSB of R is fixed to "0", the LSB of each of the obtained branch metrics bm becomes "0". In other words, the adder for the LSB in the calculation of bm can be omitted.

The path metric pm is the sum of branch metrics bm. New path metrics expressed by Formula 1 can be obtained by the sum of pm and bm. Thus, when the LSB of bm is "0", the LSB of pm is also "0". Consequently, in the calculations for pm, the adder for the LSB of pm and the register for the LSB of pm can be omitted.

Figure 6:
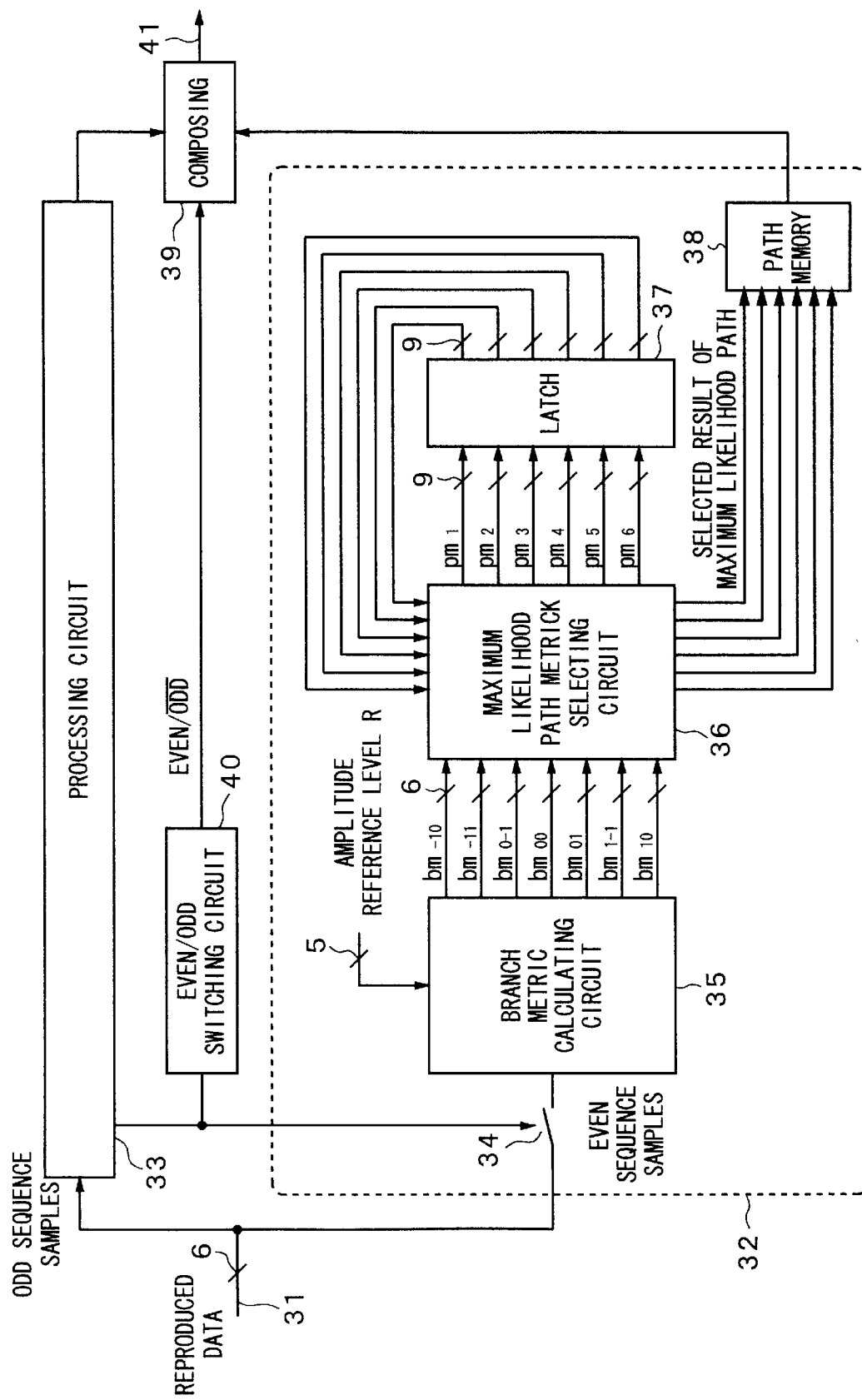
FIG. 6 is a block diagram showing a structure of a Viterbi decoder according to another embodiment of the present invention.

Thus, with such a limitation of which the LSB of the amplitude reference level R is fixed to "0", the bit width of the adder for calculating bm becomes six bits. The bit width of the adder for calculating pm becomes nine bits. The bit width of the register for storing pm becomes nine bits. FIG. 6 shows an example of the structure of the circuit with such a limitation. The number of bits of the output signal of the branch metric calculating circuit 35 becomes six bits. The bit width of the comparator in the maximum likelihood path metric selecting circuit 36 becomes six bits. The bit width of the output signal of the circuit 36 becomes nine bits. The bit width of the latch 37 becomes nine bits. The structure of the Viterbi decoder according to the second embodiment is the same as that according to the first embodiment except that the bit widths of such devices are decreased.

As described above, according to the present invention, the calculation time of each branch metric can be averaged. Thus, the calculation time of a branch metric that takes the longest time can be decreased. As a result, the overall process time of the Viterbi decoder can be increased.

In addition, since the bit widths of the adder and register necessary for calculating path metrics can be decreased, the circuit scale and power consumption of the system can be reduced. Moreover, according to the present invention, since the bit width of the adder is decreased, the calculation time necessary for the adding operations can be decreased. Thus, the overall process speed of the decoder can be increased.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A maximum likelihood decoding method, comprising the steps of:

calculating a plurality of branch metrics corresponding to input data sequences;

adding each of the calculated branch metrics and a path metric at the point so as to obtain a new path metric; and comparing the obtained path metrics and outputting a maximum likelihood path until the current point, wherein the step of calculating is performed by calculating branch metrics as corrected branch metrics so that a calculation time of each of the branch metrics is averaged.

2. The method as set forth in claim 1,
wherein the calculation of each of the corrected branch metrics is performed by at most one adding operation.

3. The method as set forth in claim 1,
wherein the step of calculating includes the step of adding a value of an amplitude reference level to a sample value of each of the data sequences, wherein a LSB of the value of the amplitude reference level is "0".

4. The method as set forth in claim 1,
wherein the step of calculating is performed by applying a limitation of which a LSB of an amplitude reference level is "0", and
wherein the step of adding is performed by calculating the path metrics without the LSB.

5. An information reproducing apparatus for reproducing data from a recording medium corresponding to a partial response system, comprising:
means for converting a signal reproduced from the recording medium into a digital signal;
means for equalizing the digital signal; and
maximum likelihood decoding means for decoding the reproduced signal corresponding to maximum likelihood decoding method,
wherein said maximum likelihood decoding means calculates branch metrics as corrected branch metrics so that a calculation time of each of the branch metrics is averaged.

6. The apparatus as set forth in claim 5,
wherein said maximum likelihood decoding means includes a branch metric calculating circuit having at most one adder.

7. The apparatus as set forth in claim 6,
wherein the branch metric calculating circuit has a limitation of which a LSB of a value of an amplitude reference level used for calculations of the branch metrics is fixed to "0".

8. The apparatus as set forth in claim 6,
wherein the branch metric calculating circuit has a limitation of which a LSB of a value of an amplitude reference level used for calculations of the branch metrics is fixed to "0", and
wherein the branch metrics are calculated without the LSB.

9. The apparatus as set forth in claim 5, further comprising:
channel code decoding means for decoding channel codes so that a minimum distance between any two selectable codes exceeds a predetermined value,
wherein the channel codes are obtained by converting information words of eight bits into code words of 10 bits.

10. An information reproducing apparatus for reproducing data from a recording medium corresponding to a partial response system, comprising:
an analog to digital converter circuit configured to convert a signal reproduced from the recording medium into a digital signal;
an equalizer circuit configured to equalize the digital signal; and
a Viterbi decoder circuit configured to decode the reproduced signal corresponding to maximum likelihood decoding method,
wherein said Viterbi decoder circuit is further configured to calculate branch metrics as corrected branch metrics so that a calculation time of each of the branch metrics is averaged.

11. The apparatus as set forth in claim 10,
wherein said Viterbi decoder circuit includes a branch metric calculating circuit having at most one adder.

12. The apparatus as set forth in claim 11,
wherein the branch metric calculating circuit has a limitation of which a LSB of a value of an amplitude reference level used for calculations of the branch metrics is fixed to "0".

13. The apparatus as set forth in claim 11,
wherein the branch metric calculating circuit has a limitation of which a LSB of a value of an amplitude reference level used for calculations of the branch metrics is fixed to "0", and
wherein the branch metrics are calculated without the LSB.

14. The apparatus as set forth in claim 10, further comprising:
a channel decoding circuit configured to decode channel codes so that a minimum distance between any two selectable codes exceeds a predetermined value,
wherein the channel codes are obtained by converting information words of eight bits into code words of 10 bits.

15. An information reproducing apparatus for reproducing data from a recording medium corresponding to a partial response system, comprising:
an analog to digital converter circuit configured to convert a signal reproduced from the recording medium into a digital signal;
an equalizer circuit configured to equalize the digital signal; and
a Viterbi decoder circuit configured to decode the reproduced signal corresponding to maximum likelihood decoding method,
wherein said Viterbi decoder circuit is further configured to calculate branch metrics as corrected branch metrics so that a calculation time of each of the branch metrics is averaged,
wherein said Viterbi decoder circuit includes a branch metric calculating circuit having at most one adder.

16. The apparatus as set forth in claim 15,
wherein the branch metric calculating circuit has a limitation of which a LSB of a value of an amplitude reference level used for calculations of the branch metrics is fixed to "0".

17. The apparatus as set forth in claim 15,
wherein the branch metric calculating circuit has a limitation of which a LSB of a value of an amplitude reference level used for calculations of the branch metrics is fixed to "0", and
wherein the branch metrics are calculated without the LSB.

18. The apparatus as set forth in claim 15, further comprising:
a channel decoding circuit configured to decode channel codes so that a minimum distance between any two selectable codes exceeds a predetermined value,
wherein the channel codes are obtained by converting information words of eight bits into code words of 10 bits.

* * * * *